United States Patent [19]

Spellman et al.

[11] 4,206,646
[45] Jun. 10, 1980

[54] TRANSDUCER COMBINING COMPARATOR OR CONVERTER FUNCTION WITH SENSOR FUNCTION

[75] Inventors: Gordon B. Spellman, Mequon; Stanley V. Jaskolski, Sussex; Herman P. Schutten, Elm Grove; Robert W. Lade, Waukesha, all of Wis.

[73] Assignee: Eaton Corporation, Cleveland, Ohio

[21] Appl. No.: 946,179

[22] Filed: Sep. 27, 1978

[51] Int. Cl.² .............................................. G01K 7/00
[52] U.S. Cl. .................................. 73/362 SC; 323/19
[58] Field of Search .................... 73/362 SC; 307/310

[56] References Cited

U.S. PATENT DOCUMENTS

| | | | |
|---|---|---|---|
| 3,475,677 | 10/1969 | Swinehart et al. | 323/21 |
| 3,548,290 | 12/1970 | Swinehart | 323/19 |
| 3,558,995 | 1/1971 | Swinehart | 317/130 |
| 3,896,369 | 7/1975 | Nakata | 323/19 |
| 3,950,991 | 4/1976 | Grass | 73/362 SC |
| 4,100,434 | 7/1978 | Iyotani et al. | 307/310 |

*Primary Examiner*—Donald O. Woodiel
*Attorney, Agent, or Firm*—Hugh R. Rather; Robert J. McCloskey; Nicholas A. Kees

[57] ABSTRACT

A transducer is disclosed which provides a digital indication of a sensed analog condition without the need of an analog to digital (A/D) converter or a comparator. A condition responsive element having a true abrupt switching characteristic at a known breakover voltage as a function of a condition being sensed is biased by a voltage source preferably supplying a periodic voltage as a known function of time. The point during the voltage source cycle at which the condition responsive element switches to its other state is determined by the sensed condition. Preferably, a clock of known frequency is enabled when the condition responsive element is in one of its states, whereby clock pulses are counted during an interval whose duration is determined by the sensed condition. The number of clock pulses counted is a digital value of the analog condition being sensed because: (i) the clock frequency is known; (ii) the voltage/time relation of the voltage source is known; and (iii) the voltage/sensed condition relation of the condition responsive element is known. A thermally sensitive thyristor is specifically disclosed for the condition responsive element.

7 Claims, 4 Drawing Figures

TRANSDUCER COMBINING COMPARATOR OR CONVERTER FUNCTION WITH SENSOR FUNCTION

BACKGROUND OF THE INVENTION

In the ever increasing usage of digital electronic components and equipment, such as minicomputers and microprocessors, one of the impediments to even wider applications thereof is the cost factor inherent in interfacing techniques with the analog world. Interfacing apparatus commonly represent the most significant cost in a total system.

Transducers typically employ a condition responsive element which produces an analog voltage as a function of the condition being sensed. In order to use this analog voltage in conjunction with microprocessors, etc., an A/D converter is necessary to translate the analog voltage to a digital value. Alternatively, a comparator could be used to produce an output signal when the analog voltage exceeds a reference level.

The area of temperature control and/or indication in automotive applications is an example of a field in which the high cost and necessity of interfacing devices has deterred usage of digital electronic equipment.

SUMMARY OF THE INVENTION

An object of the invention is to provide an improved transducer for translating a sensed analog condition into a digital value.

Another object is to substantially reduce the cost of interfacing apparatus in such transducers by eliminating the need for an A/D converter or a comparator.

A condition responsive element is provided which: (a) has a breakover voltage which is a known monotonic function of a sensed analog condition; (b) exhibits a true abrupt switching characteristic, not just a gradual change, by intrinsically switching states in response to the condition sensed; and (c) has a region of condition sensitivity, in a plot of breakover voltage versus sensed condition, which is wide enough to afford the range desired.

This breakover voltage is correlated to time by a voltage source producing a voltage which is a known monotonic function of time and biases the condition responsive element such that the condition responsive element switches states when the source voltage reaches the breakover voltage for the condition sensed. The length of time it takes the source voltage to reach the particular breakover voltage indicates the value of the sensed condition since the relationship between sensed condition and breakover voltage, and between voltage and time are known.

This known derived relationship between sensed condition and time is correlated to a digital value by timing means. For example, a clock of known frequency producing a known number of pulses as a function of time may be used wherein clock pulses are counted when selectively enabled by one state of the condition responsive element.

The digital value presented to a microprocessor, etc., is derived as a function of time, which in turn is a function of voltage, which in turn is a function of the analog condition being sensed. The need for a separate A/D converter or a comparator is eliminated because the condition responsive element performs both the sensing function and the comparing or converting function. The sensing function is performed because the breakover voltage varies with respect to sensed condition. The comparing or converting function is performed because the condition responsive element exhibits a true abrupt switching characteristic when the applied source voltage exceeds the particular breakover voltage.

DESCRIPTION OF THE PREFERRED EMBODIMENT

Figure 1:
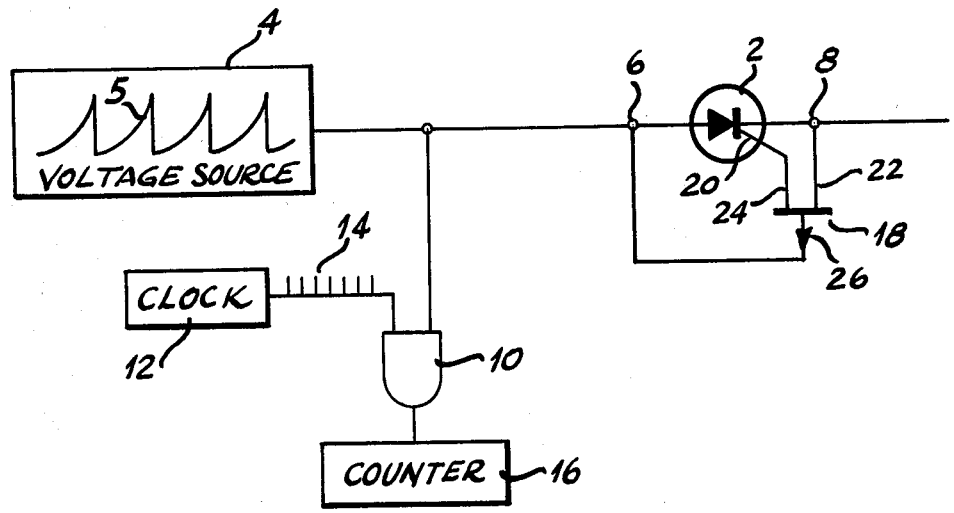
FIG. 1 is a schematic circuit diagram of the preferred embodiment of the present invention.

There is shown in FIG. 1 a transducer constructed in accordance with the invention. A thermally sensitive thyristor 2 is biased by a voltage source 4. The thyristor may be like that disclosed in Jaskolski et al U.S. Pat. No. 3,971,056 or Jaskolski et al U.S. patent application Ser. No. 652,192, filed Jan. 2, 1976. The thyristor exhibits a true abrupt current switching characteristic, FIG. 2, when the voltage applied across its anode 6 and cathode 8 exceeds its breakover voltage $V_{BO}$. At applied voltages less than $V_{BO}$ the thyristor is in its high resistance, low current off state. At applied voltages greater than $V_{BO}$ the thyristor is in its low resistance, high current on state. These two states and the abrupt change therebetween enable the thyristor to perform the comparing or converting function of the present invention, as will be more fully described hereinafter.

Figure 3:
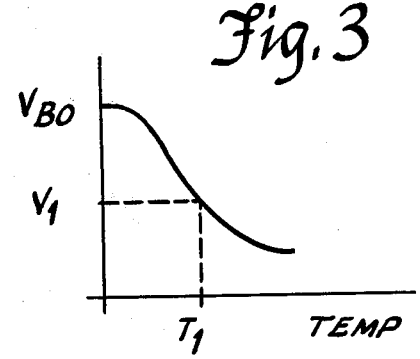
FIG. 3 is a graph of temperature versus breakover voltage for a thermally sensitive thyristor.

The breakover voltage of thyristor 2 varies with temperature as shown in FIG. 3. At higher temperatures the thyristor will break over into its on state at lower voltages. The curve giving the relationship between breakover voltage $V_{BO}$ and temperature may be calculated from the design parameters of electrical base widths, minority carrier lifetimes and relative layer resistivities as taught in said patent and said Application, or may be empirically determined. The known relationship between breakover voltage and temperature enables the thyristor to perform the sensing function of the present invention, as will be more fully described hereinafter.

Voltage source 4 supplies a cyclic periodic voltage across the thyristor in the sawtooth waveform 5 shown. This voltage varies as a known monotonic function of the time. During one period or cycle of the source, the applied sawtooth voltage rises from a minimum value to a maximum peak value as shown in solid line in FIG. 4.

If the temperature of the thyristor is low enough, its breakover voltage $V_{BO}$ will be greater than the peak sawtooth voltage value and the thyristor will remain in its off state. As temperature increases, $V_{BO}$ decreases, FIG. 3; and at some temperature, $V_{BO}$ will be less than the peak sawtooth voltage value whereby the thyristor will switch to its on state at some point in the sawtooth cycle. For example, assume that at temperature $T_1$ the thyristor exhibits a breakover voltage $V_1$, FIG. 3, and the $V_1$ is less than the peak sawtooth voltage value. The thyristor will switch states before completion of the sawtooth cycle, namely when the applied voltage from source 4 reaches $V_1$ at time $t_1$, as shown in dashed line in FIG. 4. The thyristor will remain on until the end of that cycle of the sawtooth supply. In the next cycle, the thyristor will be off until the supply voltage reaches $V_1$ (assuming same $T_1$) and will be on thereafter until the end of the cycle when the supply voltage reverts to its minimum value, and so on. It is thus seen that when the temperature increases sufficiently to make $V_{BO}$ less than the peak sawtooth value, the thyristor will turn on for a fractional portion of the cycle.

The output of the sawtooth voltage source is also supplied to an input of an AND gate 10. A clock 12 of known frequency supplies clock pulses 14 to the other input of AND gate 10. A counter 16 is connected to the output of the AND gate to count the clock signals when the AND gate is enabled by the sawtooth supply.

Assume the temperature of thyristor 2 is $T_1$. The thyristor will be in its nonconductive off state during a first portion of the sawtooth cycle wherein the sawtooth voltage is less than $V_1$. When the thyristor is off, it blocks current from source 4 and hence the output of source 4 will flow to AND gate 10, thereby enabling the AND gate to allow the passage of clock pulses 14 therethrough. These clock pulses are counted by counter 16.

Still assuming the temperature of thyristor 2 is $T_1$, the thyristor will be in its conductive on state during the remaining portion of the sawtooth cycle wherein the sawtooth voltage is greater than $V_1$. When the thyristor is on, it allows passage of current from source 4 and hence the output of source 4 will not flow to AND gate 10 but rather through thyristor 2. The AND gate is thus disabled and no counts are registered by counter 16.

Figure 4:
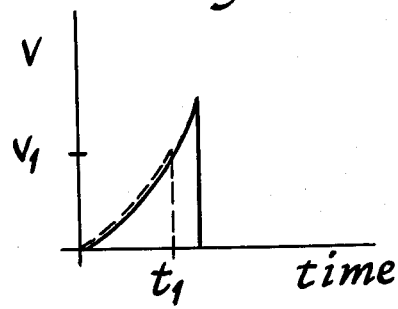
FIG. 4 is a graph of time versus voltage for one cycle of a preferred power source.

If the temperature of thyristor 2 increases above $T_1$, then $V_{BO}$ decreases to a value less than $V_1$, FIG. 3, and the thyristor will switch or breakover to its on state at an earlier time in the sawtooth cycle, FIG. 4. This means that the thyristor will be off for a shorter duration of time and hence less clock pulses will be counted. Conversely, if the temperature decreases, $V_{BO}$ increases, and the thyristor will be off for a longer portion of the sawtooth cycle and hence more clock pulses will be counted. The number of counted clock pulses thus provides a digital indication of the sensed analog temperature condition.

The number of counted clock pulses represents a duration of time which in turn represents a voltage which in turn represents the sensed temperature because the pulse to time relation of the clock 12 is known, the time to voltage relation of source 4 is known, and the breakover voltage to temperature relation of thyristor 2 is known. The number of clock pulses counted gives a measure of time which indicates how long the thyristor is off during a cycle of the sawtooth supply. This length of time corresponds to a designated voltage, FIG. 4, because the supply voltage is a known function of time. This designated voltage, at which the thyristor breaks over, corresponds to the temperature of the thyristor, FIG. 3, because the breakover voltage of the thyristor is a known function of temperature.

Figure 2:
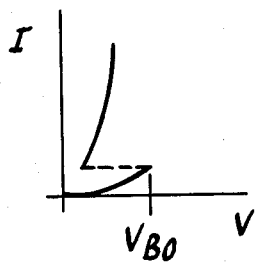
FIG. 2 is a graph of voltage versus current for a thyristor, showing the true abrupt switching characteristic thereof.

Though a thermally sensitive thyristor is disclosed, other condition responsive elements may be used, whether the condition be temperature, pressure, light, etc., provided: (a) there is a true abrupt switching characteristic, for example as shown in FIG. 2, and not just a gradual change; (b) the breakover voltage is a known function of the condition sensed; and (c) the region of condition sensitivity with respect to breakover voltage (e.g. sloped portion of the curve in FIG. 3) is wide enough to afford the range needed for the particular application. The abrupt switching characteristic in combination with the remainder of the invention enables the elimination of an A/D converter or a comparator. The variance of breakover voltage with respect to the sensed condition and the known relation therebetween enable the sensing function to be performed. The required width of the condition sensitivity region depends on the desired degree of accuracy and resolution for a particular application.

Though a sawtooth voltage source is disclosed, other voltage producing means may be used provided only that the voltage is a known monotonic function of time, whether periodic or not.

Though a clock is disclosed, other timing means responsive to the breakover of the condition responsive element may be used.

Numerous other modifications are of course possible. For example, thyristor 2 could be put in series with AND gate 10 to afford counting of clock pulses when the thyristor is in its conductive on state.

When used in conjunction with a microprocessor or the like, the cost savings and elimination of extra parts afforded by the present invention is apparent. Most microprocessors already have a clock as well as counters and AND gates. The present invention and combination thus enables the simple addition of a condition responsive breakover element in cooperation with parts already present in the system to afford a transducer without the necessity of an A/D converter or a comparator. The condition responsive element is a simple, low cost interfacing device.

There is additionally disclosed in FIG. 1 variable resistance means, such as field effect transistor (FET) 18, connected between the gate 20 and cathode 8 of thyristor 2. The combination of the thyristor and the variable resistance means is disclosed and claimed in copending Schutten et al U.S. patent application Ser. No. 946,180, filed Sept. 27, 1978. The switching temperature of a thermally sensitive thyristor at a given voltage can be varied by changing the resistance between the gate and cathode. As a resistance decreases, the switching temperature increases. FET 18 has its drain 22 connected to the thyristor cathode 8, its source 24 connected to the thyristor gate 20, and its gate 26 connected to the thyristor anode 6, whereby to provide a resistance between the gate and cathode of the thyristor which varies during the cycle as the bias level on the FET changes in response to the changing supply from source 4 across the thyristor. This stretches or widens the slope portion of the curve of FIG. 3 along the horizontal temperature axis, i.e. the slope becomes more gradual. A steep slope gives extreme accuracy but narrow range, which may or may not be desirable depending on the particular application.

It is thus seen that the present invention is easily incorporable with other devices to provide certain desired performance characteristics for particular applications, as in the above example of expanding the condition sensitive region with respect to breakover voltage of the condition responsive element. It is recognized that numerous other additions may be made to the basic concept embodied by the present invention.

We claim:
1. A transducer comprising:
   a condition responsive single switch element exhibiting:
   a breakover voltage as a known function of an analog condition being sensed;

a true abrupt switching characteristic at said breakover voltage between a nonconductive off state and a conductive on state; and a region of condition sensitivity with respect to said breakover voltage which is wide enough to afford sufficient range;

a voltage source supplying voltage to said switching element as a known monotonic function of time; and means for measuring time with respect to switching of said switching element;

wherein the measured time between said switching and a reference point corresponds to a designated supply voltage value due to the known relationship between source voltage and time, and wherein said designated supply voltage value corresponds to a particular value of said condition being sensed because of the known relationship between said breakover voltage and said condition, whereby said measured time indicates the value of said condition.

2. A transducer comprising:

a condition responsive switch element exhibiting:

a breakover voltage as a known function of an analog condition being sensed;

a true abrupt switching characteristic at said breakover voltage between a nonconductive off state and a conductive on state; and a region of conditon sensitivity with respect to said breakover voltage which is wide enough to afford sufficient range;

a voltage source supplying voltage to said switching element as a known monotonic function of time; and means for measuring time with respect to switching of said switching element;

wherein the measured time between said switching and a reference point corresponds to a designated supply voltage value due to the known relationship between source voltage and time, and wherein said designated supply voltage value corresponds to a particular value of said condition being sensed because of the known relationship between said breakover voltage and said condition, whereby said measured time indicates the value of said condition; and wherein said time measuring means comprises a clock supplying clock pulses of known frequency, counter means for counting said clock pulses, and enabling means responsive to one of said states of said switching element to enable counting of said clock pulses, the number of counted clock pulses providing a digital indication of said analog condition being sensed.

3. A transducer according to claim 2 wherein said voltage source supplies a period voltage such that for a given range of values of said condition said breakover voltage of said switching element will be less than the maximum source voltage and greater than the minimum source voltage, whereby said switching element will switch between said states during each cycle of said source voltage when the value of said condition is in said range, clock pulses being counted during the fractional portion of said cycle when said switching element is in said one state, the number of counted clock pulses indicating that point in the cycle at which the switching element switches, the source voltage at this point in the cycle being known whereby said breakover voltage is known which in turn indicates the value of said condition being sensed.

4. A transducer according to claim 3 wherein said switching element is a thermally sensitive thyristor whereby said condition is temperature.

5. A transducer according to claim 3 wherein said enabling means is connected in parallel with said switching element and supplied by said voltage source such that during a first portion of said cycle when said source voltage is less than said breakover voltage said switching element is in said nonconductive state and the supply from said voltage source flows to said enabling means to enable counting of said clock pulses, and such that during the remainder of said cycle when said source voltage is greater than said breakover voltage said switching element is in said conductive state and the supply from said voltage source flows through said switching element rather than to said enabling means.

6. A transducer according to claim 5 wherein said enabling means comprsies an AND gate having one input connected to said voltage source and the other input connected to said clock, and an output connected to said counter means.

7. A transducer comprising:

a condition responsive switch element exhibiting:

a breakover voltage as a known function of an analog condition being sensed;

a true abrupt switching characteristic at said breakover voltage between a nonconductive off state and a conductive on state; and a region of condition sensitivity with respect to said breakover voltage which is wide enough to afford sufficient range;

a voltage source supplying voltage to said switching element as a known function of time;

a time base reference supplying time base data; and means for selectively registering said time base data during one of said states of said switching element;

wherein said registered time base data corresponds to a designated supply voltage value due to the known relationship between source voltage and time, and wherein said designated supply voltage value corresponds to a particular value of said condition being sensed because of the known relationship between said breakover voltage and said condition, whereby said registered time base data indicates the value of said condition.

* * * * *